(12) United States Patent
Hsiao et al.

(10) Patent No.: US 11,663,268 B2
(45) Date of Patent: May 30, 2023

(54) METHOD AND SYSTEM FOR RETRIEVING VIDEO TEMPORAL SEGMENTS

(71) Applicant: GUANGDONG OPPO MOBILE TELECOMMUNICATIONS CORP., LTD., Guangdong (CN)

(72) Inventors: Jenhao Hsiao, Palo Alto, CA (US); Chiuman Ho, Palo Alto, CA (US)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 484 days.

(21) Appl. No.: 17/025,275

(22) Filed: Sep. 18, 2020

(65) Prior Publication Data

US 2021/0004605 A1    Jan. 7, 2021

Related U.S. Application Data

(63) Continuation of application No. PCT/CN2019/079054, filed on Mar. 21, 2019.

(Continued)

(51) Int. Cl.
*G06F 16/732* (2019.01)
*H04N 19/109* (2014.01)
(Continued)

(52) U.S. Cl.
CPC ...... *G06F 16/7343* (2019.01); *G06F 16/7837* (2019.01); *G06F 16/7844* (2019.01);
(Continued)

(58) Field of Classification Search
CPC ............ G06F 16/7343; G06F 16/7837; G06F 16/7844; G06F 16/7847; G06F 18/24;
(Continued)

(56) References Cited

U.S. PATENT DOCUMENTS

| 5,895,464 A | 4/1999 | Bhandari et al. |
| 2009/0154806 A1* | 6/2009 | Chang ............. G06V 20/48 |
| | | 382/173 |

(Continued)

FOREIGN PATENT DOCUMENTS

| CN | 107515895 A | 12/2017 |
| JP | 2013235491 A | 11/2013 |

(Continued)

OTHER PUBLICATIONS

Kiros et al, "Unifying Visual-Semantic Embeddings with Multimodal Neural Language Models", https://arxiv.org/pdf/1411.2539.pdf, NIPS 2014, Nov. 10, 2014. (13 pages).

(Continued)

*Primary Examiner* — Juan A Torres
(74) *Attorney, Agent, or Firm* — Young Basile Hanlon & MacFarlane, P.C.

(57) ABSTRACT

A method and a system for retrieving video temporal segments are provided. In the method, a video is analyzed to obtain frame feature information of the video; the frame feature information is input into an encoder to output first data relating to temporal information of the video; the first data and a retrieval description for retrieving video temporal segments of the video are input into a decoder to output second data; attention computation training is conducted according to the first data and the second data; video temporal segments of the video corresponding to the retrieval description are determined according to the attention computation training.

20 Claims, 8 Drawing Sheets

Related U.S. Application Data (60) Provisional application No. 62/646,834, filed on Mar. 22, 2018.

(51) Int. Cl.

| | | |
|---|---|---|
| *G06F 16/783* | (2019.01) | |
| *G06V 20/40* | (2022.01) | |
| *G06N 3/045* | (2023.01) | |
| *G06V 10/764* | (2022.01) | |
| *G06V 10/82* | (2022.01) | |

(52) U.S. Cl.
CPC ........... *G06N 3/045* (2023.01); *G06V 10/764* (2022.01); *G06V 10/82* (2022.01); *G06V 20/41* (2022.01); *G06V 20/46* (2022.01); *G06V 20/49* (2022.01); *H04N 19/109* (2014.11)

(58) Field of Classification Search
CPC .......... G06N 3/045; G06N 3/044; G06N 3/08; G06V 10/764; G06V 10/82; G06V 20/41; G06V 20/46; G06V 20/49; H04N 19/109
USPC ....................................................... 382/103
See application file for complete search history.

(56) References Cited

U.S. PATENT DOCUMENTS

| | | | | |
|---|---|---|---|---|
| 2016/0105634 | A1* | 4/2016 | Marchese | ................ H04N 5/91 386/241 |
| 2017/0357720 | A1 | 12/2017 | Torabi et al. | |
| 2019/0377955 | A1* | 12/2019 | Swaminathan | .. H04N 21/23418 |

FOREIGN PATENT DOCUMENTS

| | | |
|---|---|---|
| JP | 2016009430 A | 1/2016 |
| WO | 2018127627 A1 | 7/2018 |

OTHER PUBLICATIONS

Korean Office Action with English Translation for KR Application 1020207027945 dated May 30, 2022. (15 pages).
Japanese Notice of Reasons for Refusal with English Translation for JP Application 2020551293 dated Nov. 5, 2021. (6 pages).
Indian Examination Report for IN Application 202017045041 dated Dec. 3, 2021. (5 pages).
Australian Examination Report No. 2 for AU Application 2019239454 dated Aug. 16, 2021. (4 pages).
"Person Search with Natural Language Description",Shuang Li et al; 2017 IEEE Conference on Computer Vision and Pattern Recognition(CVPR) dated Jul. 26, 2017; ISSN:1063-6919 part 3.
International search report issued in corresponding international application No. PCT/CN2019/079054 dated Jun. 12, 2019.
M. Otani, Y. Nakashima, E. Rahtu, J. Heikkila, and N. Yokoya. "Learning joint representations of videos and sentences with web image search. In ECCV Workshops", 2016.
A. Torabi, N. Tandon, and L. Sigal. "Learning language visual embedding for movie understanding with natural language." arXiv preprint arXiv:1609.08124, 2016.
R. Xu, C. Xiong, W. Chen, and J. J. Corso. "Jointly modeling deep video and compositional text to bridge vision and language in a unified framework." In AAAI, 2015.
Buch et al., SST: Single-Stream Temporal Action Proposals, CVPR 2017.
Escorcia et al., DAPs: "Deep Action Proposals for Action Understanding", ECCV 2016.
Hendricks1 et al., "Localizing Moments in Video with Natural Language", arXiv preprint 2017.
Kaiming He, Xiangyu Zhang, Shaoqing Ren, and Jian Sun, "Deep Residual Learning for Image Recognition", CVPR 2016.
D. Tran, L. Bourdev, R. Fergus, L. Torresani, and M. Paluri, "Learning Spatiotemporal Features with 3D Convolutional Networks", ICCV 2015.
Ilya Sutskeveret al, "Sequence to Sequence Learning with Neural Networks", NIPS 2014.
Xu et al, Video Question Answering via Gradually Refined Attention over Appearance and Motion, dated Oct. 17, 2017. (9 pages).
Australian Examination Report for AU Application 2019239454 dated Mar. 26, 2021. (8 pages).
Song et al, Hierarchical LSTM with Adjusted Temporal Attention for Video Captioning, dated Jun. 5, 2017. (pp. 2737-2743).
Yu et al, End-to-End Concept Word Detection for Video Captioning, Retrieval, and Question Answering, dated Jul. 25, 2017. (22 pages).
Li Yao et al, Describing Videos by Exploiting Temporal Structure, dated Oct. 1, 2015. (23 pages).
Extended European Search Report for EP Application 19771091.6 dated Apr. 23, 2021. (7 pages).

\* cited by examiner

METHOD AND SYSTEM FOR RETRIEVING VIDEO TEMPORAL SEGMENTS

CROSS-REFERENCE TO RELATED APPLICATION(S)

This application is a continuation of International Application No. PCT/CN2019/079054, filed on Mar. 21, 2019, which claims priority to U.S. provisional application No. 62/646,834, filed on Mar. 22, 2018, the disclosures of which are hereby incorporated by reference in their entireties.

TECHNICAL FIELD

The present disclosure relates to machine learning, and particularly to a method and system for retrieving video temporal segments.

BACKGROUND

Localizing moments in video with natural language is an important research topic with huge business potential and applications, such as video retrieval, video summarization, video description and question answering, to name a few. However, most existing systems are designed to retrieve whole video clips with natural language, which determines what occurs in a video but not when. A few previous works try to propose moment retrieval systems but they can only achieve very limited accuracy due to the scarce and unavailability of a video dataset, which has to contain huge pairs of localized video segments and referring expressions, or text descriptions that uniquely identify a corresponding moment.

Most existing systems aim to retrieve a specific video (instead of a moment in a video) given a natural language search. Natural language video retrieval methods aim to retrieve a specific video given a natural language search. Current methods adopt deep video-language embeddings similar to traditional image-language embeddings. For such whole video retrieval, see [1] M. Otani, Y. Nakashima, E. Rahtu, J. Heikkila, and N. Yokoya. "Learning joint representations of videos and sentences with web image search," In ECCV Workshops, 2016; [2] A. Torabi, N. Tandon, and L. Sigal. "Learning language visual embedding for movie understanding with natural language," arXiv preprint arXiv:1609.08124, 2016; [3] R. Xu, C. Xiong, W. Chen, and J. J. Corso. "Jointly modeling deep video and compositional text to bridge vision and language in a unified framework," in AAAI, 2015. However, methods in this category cannot achieve a segment-level video retrieval.

Some previous works have leveraged temporal action proposals for efficient action detection, where the proposals identify relevant temporal windows that are then independently classified by an action classifier in a second stage. However, methods in this category can only predict potential event proposals in a video, but unable to help the retrieval task. For such temporal action proposals, see [4] Buch et al., SST: "Single-Stream Temporal Action Proposals," CVPR 2017; [5] Escorcia et al., DAPs: "Deep Action Proposals for Action Understanding," ECCV 2016.

A few previous works (for example, see [6] Hendricks et al., "Localizing Moments in Video with Natural Language," arXiv preprint 2017) have studied retrieving temporal segments within a video based on a paired temporal-description dataset. However, such a paired dataset is labor intensive and hard to acquire in practice.

SUMMARY

According to one innovative aspect of the subject matter described in this disclosure, a method for retrieving video temporal segments is provided. The method may include: analyzing a video to obtain frame feature information of the video, inputting the frame feature information into an encoder to output first data relating to temporal information of the video, inputting the first data and a retrieval description for retrieving video temporal segments of the video into a decoder to output second data, conducting attention computation training according to the first data and the second data, and determining video temporal segments of the video corresponding to the retrieval description according to the attention computation training.

According to another innovative aspect of the subject matter described in this disclosure, a method for retrieving video temporal segments is provided. The method may include: analyzing a video to obtain frame feature information of the video; conducting attention computation training according to first data and second data, the first data relates to temporal information of the video and is obtained via an encoder by using the frame feature information as an input, the second data is obtained via a decoder by using at least the first data and a retrieval description as inputs; determining video temporal segments of the video corresponding to the retrieval description according to the attention computation training.

According to another innovative aspect of the subject matter described in this disclosure, a system for retrieving video temporal segments is provided. The system may include: an extractor, configured to extract frame feature information of a video input thereto; an encoder, coupled with the extractor and configured to obtain temporal information of the video according to the frame feature information; a decoder, coupled with the encoder and configured to receive the temporal information from the encoder, receive a retrieval description from outside, and obtain state information of the decoder according to the temporal information and the retrieval description; a layer generator, coupled with the encoder and the decoder and configured to receive the temporal information from the encoder and the state information from the decoder, and to conduct attention computation according to the temporal information and the state information; and a processor, coupled with the layer generator and configured to determine video temporal segments of the video corresponding to the retrieval description according to the attention computation at the layer generator.

As one implementation, the layer generator of the system may further include an attention layer generator and a FC layer generator. The attention layer generator is coupled with the encoder and the decoder and is configured to obtain a temporal attention weight of each video temporal segment of the video based on correlation of each video temporal segment with each description term of the retrieval description, and to obtain a weighted average information of the temporal information, according to the temporal attention weight. The FC layer generator is coupled with the decoder and the attention layer generator and is configured to obtain final attention information based on the weighted average information and the state information, and to output the final attention information to the decoder.

According to still another innovative aspect of the subject matter described in this disclosure, a computer system is provided. The system may include: at least one non-transitory computer memories for storing and providing access to data; at least one processors coupled to the non-transitory computer memories to access data; a convolutional neural network (CNN) storable by the at least one non-transitory computer memories and executable by the at least one processors, the CNN being configured to extract frame feature information of a video; a video-description based modeler storable by the at least one non-transitory computer memories and executable by the at least one processors. The modeler may include: a first stacked recurrent neural network (RNN) coupled with the CNN and configured to obtain temporal information of the video according to the frame feature information of the video; a second stacked RNN coupled with the first RNN and configured to make hidden representation-based output according to the temporal information and a retrieval description; an attention layer hierarchical temporal memory (HTM) coupled with the first RNN and the second RNN and configured to obtain an temporal attention weight of each video temporal segment in the video based on the temporal information and the hidden representation-based output. The modeler may further include a FC layer HTM coupled with the attention layer HTM and the second stacked RNN and configured to provide input for the second stacked RNN.

According to still another innovative aspect of the subject matter described in this disclosure, a computer system is provides. The computer system may include at least one processors, and at least one non-transitory memories storing instructions that, when executed by the at least one processors, cause the computer system to perform operations including: analyzing a video to obtain frame feature information of the video, inputting the frame feature information into an encoder to output first data relating to temporal information of the video, inputting the first vector and a retrieval description for retrieving video temporal segments of the video into a decoder to output second data, conducting attention computation training according to the first data and the second data, and determining video temporal segments of the video corresponding to the retrieval description according to the attention computation training.

In at least one embodiment, the attention layer HTM is configured to obtain the temporal attention weight by:

$$\text{score}(h_t, h_s) = h_t^T W h_s$$

$$\alpha_{ts} = \frac{\exp(\text{score}(h_t, h_s))}{\sum_{s'=1}^{S} \exp(\text{score}(h_t, h_{s'}))}$$

where $h_s$ represents the temporal information output from the first stacked RNN; $h_t$ represents the hidden representation output from the second stacked RNN; W represents a weight matrix for generating un-normalized temporal score, and $\alpha_{ts}$ represents the temporal attention weight.

In at least one embodiment, the modeler further includes: a fully connected (FC) layer HTM coupled with the attention layer HTM and the second stacked RNN, and configured to provide input for the second stacked RNN.

In at least one embodiment, the attention layer HTM is further configured to obtain a context vector $c_t$ as follows and output the context vector to the FC layer HTM:

$$c_t = \sum_s \alpha_{ts} h_s.$$

In at least one embodiment, the FC layer HTM is configured to obtain a final attention vector $a_t$ as follows and input the final attention vector to the second stacked RNN:

$$a_t = \tan h(W_c[c_t; h_t])$$

where Wc represents a weight matrix for generating $a_t$.

DETAILED DESCRIPTION

This disclosure provides a technology relates to video retrieval with natural language, specifically, video temporal segments retrieval with natural language based on weakly-supervised learning, which aims to retrieve a specific video or temporal interval in a video given a natural language query. Weakly-supervised learning refers to machine-learning techniques that work with weak supervision. Specifically, weakly supervised learning is an umbrella term covering a variety of studies that attempt to construct predictive models by learning with weak supervision. In this context, we will not go into detail regarding the weakly-supervised learning and we will focus on video retrieval.

With regarding to video temporal segments retrieval, the traditional method of Hendricks mentioned above has to maintain huge pairs of localized video segments and referring expressions, or text descriptions that uniquely identify a corresponding moment. A great deal of labor and a great storage space is required to achieve Hendricks architecture.

With this in mind, a video temporal segments retrieval technology is provided in this disclosure, which can efficiently and effectively retrieve a specific temporal segment, or moment, from a video given a natural language text description without the need of the aforementioned paired moment-description data of Hendricks. In some embodiments, the technology may be based on a video and a retrieval description such as a text description, as discussed further below. Given the video frames (without the information of corresponding video segments) and the text description, the proposed technology can automatically learn from a video the temporal interval (also known as temporal segment, temporal interval, temporal frame, video frame, video clip, and the like, these terms can be interchangeable in the absence of conflict) corresponding to the text description based on an attention mechanism which will be detailed below. This disclosure thus makes video moment retrieval feasible in a real-world product and avoids the gigantic cost of human labeling of localizing video segments for text.

While embodiments described here are often related to video temporal segments retrieval based on a text description, the technology described herein may be applied to other suitable areas, such as voice input, in which case the voice can be converted into to a text for subsequent video temporal segments retrieval.

In the following, the disclosure is illustrated by way of example, and not by way of limitation in the figures of the accompanying drawings in which like reference numerals are used to refer to similar elements.

Figure 1:
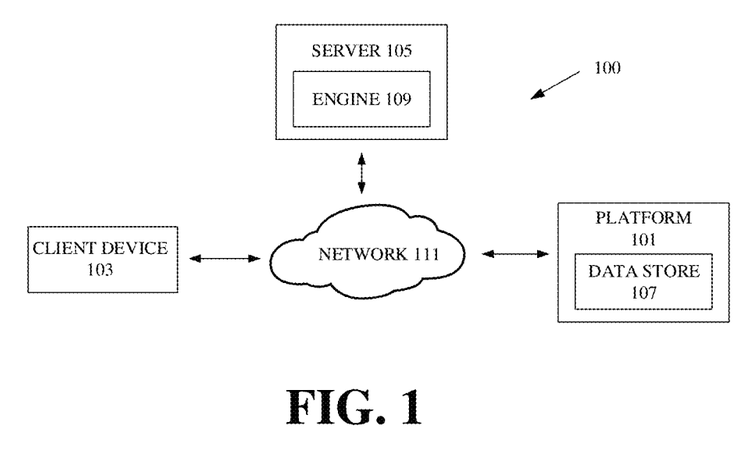
FIG. 1 is a block diagram of an example system for video temporal segments retrieval behavior.

FIG. 1 is a block diagram of an example system for video temporal segments retrieval behavior. As illustrated, the system 100 includes a platform(s) 101, a client device 103, and a server 105. These entities of the system 100 are communicatively coupled via a network 111. It should be noted that the system 100 depicted in FIG. 1 is provided by way of example and the system 100 may include additional and/or fewer components, may combine components and/or divide one or more of the components into additional components. For example, the platform 101 may be integrated into the server 105.

The network 111 may be a conventional type, wired and/or wireless, and may have numerous different configurations. For example, the network 111 may include one or more local area networks (LAN), wide area networks (WLAN), public networks, private networks, virtual networks, peer-to-peer networks, and the like.

The platform 101 can be an integration of various network resources such as videos, audios, articles, and the like. The platform 101 can be a network server including a data store 107 for storing various data information. Alternatively, the platform 101 can be a data storage device.

The client device 103 may include a memory(s), a processor(s), and/or a communication unit(s). The client device 103 is coupled to the network 111 and may send and receive data to and from the server 105. Non limiting examples of the client device 103 include a mobile phone, a laptop computer, a desktop computer, a tablet computer, a personal digital assistant (PDA) or any other electronic devices capable of processing information and accessing the network 111.

The server 105 may include an engine 109. The engine 109 includes computer logic operable to receive and process data from the client device 103 and/or the platform 101. In some embodiments, the engine 109 is a video temporal segments retrieval engine, and is configured to conduct video temporal segments retrieval based on a text description from the client device 103 and a video from the platform 101. In some embodiments, the engine 109 is configured to conduct video temporal segments retrieval based on a text description from the client device 103 and the video stored at the client device 103 locally. In some embodiments, the engine 109 may be implemented using software executable by one or more processors of one or more computer devices. In some embodiments, the engine 109 may be implemented using hardware, such as but limited to a field-programmable gate array (FPGA), an application-specific integrated circuit (ASIC), etc. In some embodiments, the engine 109 may be implemented using a combination of hardware and software.

Figure 2:
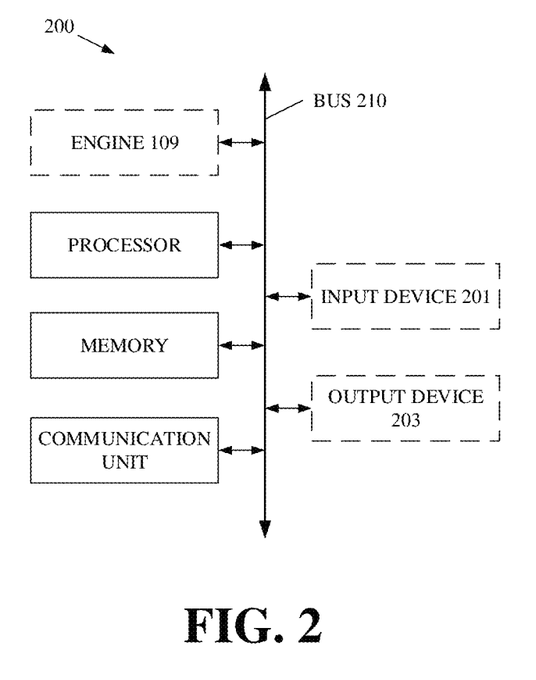
FIG. 2 is a block diagram of an example computing system.

FIG. 2 is a block diagram of an example computing system 200, which may represent the architecture of the client device 103 or the server 105. Components in the client device 103 or the components in the server 105 can be coupled and communicated via a bus 210.

As depicted, the computing system 200 may represent the architecture of the client device 103. In this case, as illustrated, the client device 103 may include a processor(s), a memory(s), and a communication unit(s). The client device 103 further includes an input device 201 and an output device 203. The input device 201 may include any standard devices configured to receive a variety of control inputs (such as text, voice, and the like) from a user. Non-limiting examples of the input device 201 include a keyboard, a mouse, a touch screen, a microphone, a speaker or other audio input devices, and the like. The output device 203 can be any standard device configured to output or display information to a user or an external device. Non-limiting examples of the output device include a display/monitor for presenting information to the user. In this context, in one implementation, the outputting information is video temporal segments (in other words, video clips).

The client device 103 may also have an App(s) installed for video playback. With regarding to the App, the present disclosure is not particularly limited.

Alternatively, the computing system 200 may represent the architecture of the server 105, which includes a processor(s), a memory(s), and a communication unit(s), and the engine 109, which will be detailed below with reference to FIG. 3.

Figure 3:
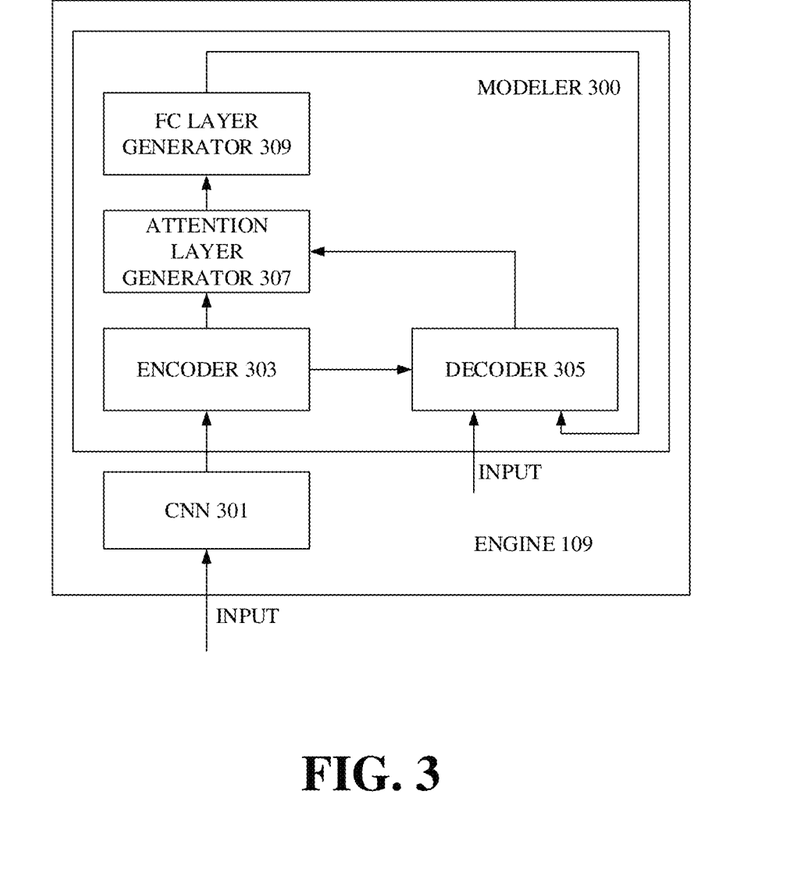
FIG. 3 is a block diagram of an example video temporal segments retrieval engine.

FIG. 3 is a block diagram of an example video temporal segments retrieval engine. As illustrated, the video temporal segments retrieval engine 109 may include various subcomponents, such as a modeler 300 and a convolutional neural network (CNN) 301. The modeler 300 is configured to model or train video temporal segments retrieval using input data, and may include a CNN 301, an encoder 303, a decoder 305, an attention layer generator 307, and an FC layer generator 309. In some embodiments, one or more of the components 301, 303, 305, 307, and 309 are sets of instructions executable by a processor(s) such as the processor illustrated in FIG. 2. In further embodiments, one or more of the components 301, 303, 305, 307, and 309 are storable in a memory(s) such as the memory illustrated in FIG. 2.

The video temporal segments retrieval engine 109 includes computer logic operable to retrieve video temporal segments. In some embodiments, as discussed in further detail herein, the input information to the CNN 301 may include video. The video contains multiple video clips. "Video clips" are short clips of videos, usually part of a longer recording. "Video clip" referred to herein is more loosely used to mean any short video less than the length of a traditional television program. The input information to the decoder 305 may include text or voice. In case of voice input, the decoder may be equipped with a voice-text converter. For example, the input of the decoder can be a retrieval description for searching, in a video, some video clips or video segments that fit or match the description.

During a training stage, the CNN 301 is configured to extract frame feature information (in other words, frame features) of a video input. The vector representation of the extracted frame features is fed to the encoder 303. The encoder 303 is configured to record temporal information and output current state information of the encoder 303 to both of the decoder 305 and the attention layer generator 307. The decoder 305 is configured to receive the output of the encoder 303 and a training input such as the retrieval description, and output its current hidden representation to the attention layer generator 307. Thus, the attention layer generator 307 can receive the output of both the encoder 303 and the decoder 305 and conduct attention calculation to obtain parameters such as temporal attention weight for indicating the correlation between each video clip and the target word (i.e., a description term in a retrieval description) and a context vector for a compact representation of the whole source video. The output (for example, the context vector) of the attention layer generator 307 will be fed to the FC layer generator 309 to obtain a final attention vector, which will be provided to the decoder 305 as an input thereof for subsequent training and output of the decoder 305.

During such training, an attention layer can be obtained at the attention layer generator 307 and an FC layer can be obtained at the FC layer generator 309. The attention layer and the FC layer will be further described in detail hereinafter.

With the model thus trained by the engine 109, at a reference stage, the server 105 can retrieve a specific temporal video segment (based on the user's retrieval description input via the client device 103) without the need of the huge paired moment-description data during training the model, which addresses the issues in traditional methods.

The training stage and the reference stage depicted above will be further discussed with reference to figures.

Figure 4:
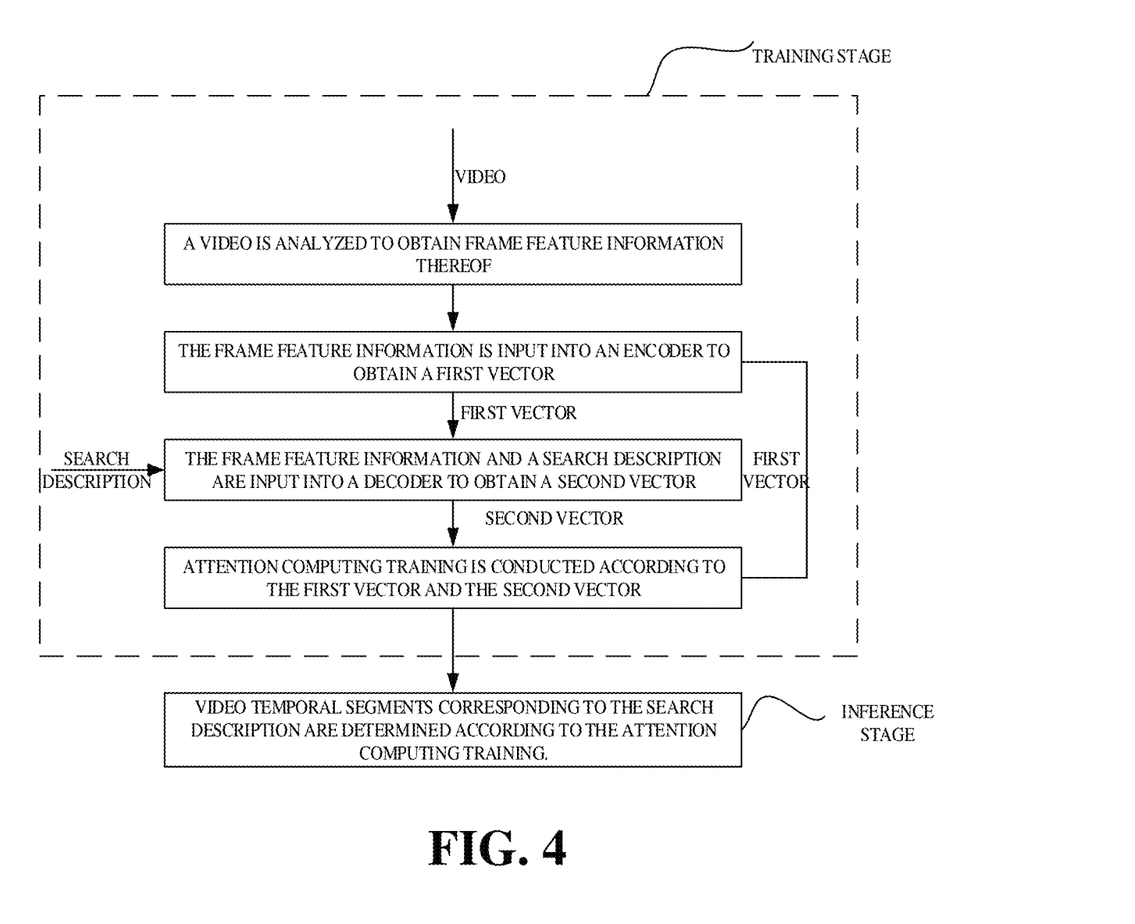
FIG. 4 is a schematic flow chart illustrating a method for retrieving video temporal segments.

FIG. 4 illustrates a schematic flow chart illustrating a method for retrieving video temporal segments. As illustrated in FIG. 4, the method for retrieving video temporal segments may include the training stage and the inference stage. At the training stage, a video received will be analyzed by a CNN for example to obtain frame feature information of the video. The frame feature information is then input into an encoder (for example, a LSTM/RNN) to output first data such as a first vector ($h_s$) relating to temporal information of the video. The first vector and a retrieval description for retrieving video temporal segments of the video are input into a decoder (for example, a LSTM/RNN) to output second data such as a second vector ($h_t$). Thereafter, attention computation training is conducted (for example, at an attention layer) according to the first vector ($h_s$) and the second vector ($h_t$).

The attention computation training can be achieved as follows. The first vector and the second vector are input into an attention layer coupled with the encoder and the decoder. At the attention layer, a temporal attention weight ($\alpha_t$) for each video temporal segment of the video is obtained based on correlation of each video temporal segment with each description term contained in the retrieval description. At the attention layer, based on the temporal attention weight ($\alpha_t$) and the second vector ($h_t$), weighted average data such as a weighted average vector ($c_t$) of the first vector is obtained and output to a FC layer coupled with the attention layer and the decoder. At last, at the FC layer, based on the weighted average vector and the second vector, a final attention vector ($a_t$) is obtained and output to the decoder.

Figure 5:
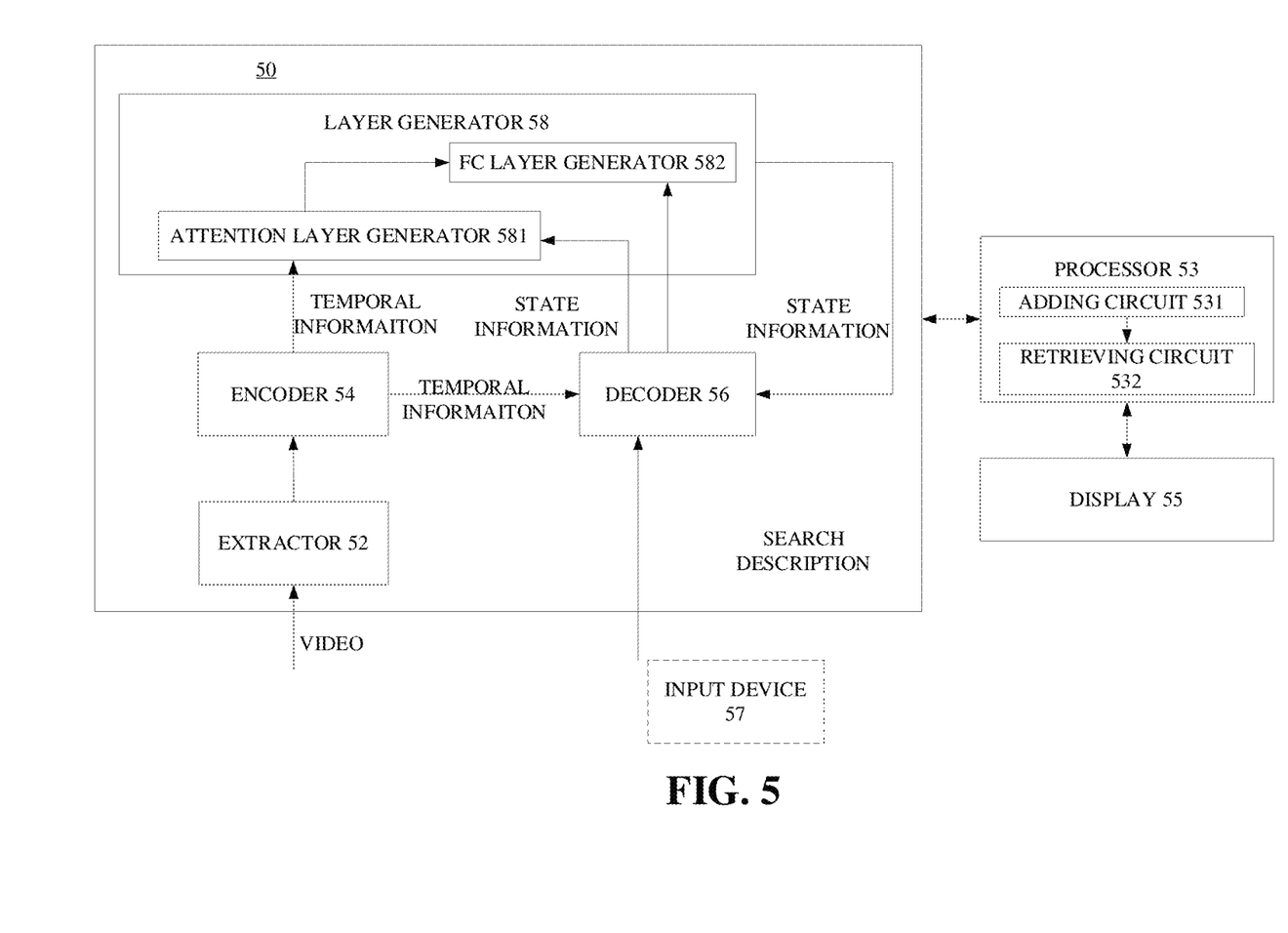
FIG. 5 is a schematic block diagram illustrating a system for retrieving video temporal segments.

In order to implement the method illustrated in FIG. 4, a system for retrieving video temporal segments is also provided. FIG. 5 is a schematic block diagram illustrating a system for retrieving video temporal segments. As illustrated, the system 50 includes an extractor 52 (such as a 2D/3D CNN), an encoder 54 (such as a LSTM/RNN), a decoder 56 (such as a LSTM/RNN), and a layer generator 58 for learning layers. In one implementation, the encoder 54 and the decoder 56 can be implemented with separate LSTMs. In some examples, the system 50 may further include a processor 53. In one implementation, the processor 53 is coupled with the above components 52, 54, 56, and 58. Alternatively, the processor 53 may be coupled with the layer generator 58. In some examples, the processor 53 may be further coupled with a display for displaying information such retrieval results of the system 50 to users. In some examples, the decoder 56 may be configured to be coupled with an input device 57 for inputting data. As mentioned, the input device can be an input device for text input such as a keyboard, a touch screen and the like, or an input device for voice input such as a microphone. Components of the system 50 will be described below in detail.

The extractor 52 is configured to extract frame feature information of a video input thereto is configured to extract frame feature information of a video input thereto. The encoder 54 is coupled with the extractor 52 and is configured to obtain temporal information (corresponding to the first vector $h_s$) of the video according to the frame feature information. The decoder 56 is coupled with the encoder 54 and is configured to receive the temporal information from the encoder 54, to receive a retrieval description from outside (for example, from the input device 57), and to obtain state information (corresponding to the second vector $h_t$) of the decoder 56 according to the temporal information and the retrieval description. The layer generator 58 is coupled with the encoder 54 and the decoder 56 and is configured to receive the temporal information from the encoder 54 and the state information from the decoder 56, and to conduct attention computation according to the temporal information and the state information.

In some embodiments, the layer generator 58 may include an attention layer generator 581 for generating an attention layer and a FC layer generator 582 for generating a FC layer. Even the attention layer generator 581 and FC layer generator 582 are shown as integrated into the layer generator 58, other architectures can also be used. For example, the attention layer generator 581 and FC layer generator 582 can be separated from each other.

The attention layer generator 581 is coupled with the encoder 54 and the decoder 56 and is configured to obtain an temporal attention weight ($\alpha_t$) of each video temporal segment of the video based on the correlation of each video temporal segment with each description term of the retrieval description, and to obtain a weighted average vector ($c_t$) of the first vector, according to the temporal attention weight ($\alpha_t$). The parameters referred to herein will be described in detail below.

The FC layer generator 582 is coupled with the decoder 56 and the attention layer generator 581 and configured to obtain a final attention vector ($\alpha_t$) based on the weighted average vector ($c_t$) and the state information ($h_t$), and to output the final attention vector to the decoder 56. The parameters referred to herein will be described in detail below.

The processor 53 is coupled with the layer generator 58 and is configured to determine video temporal segments of the video according to the attention computation at the layer generator. The processor 53 may also be coupled with the display 55 and provide the retrieval result of the system 50 to the display 55 for display.

As one implementation, the processor 53 includes an adding circuit 531 and a retrieving circuit 532, which will be enabled during the inference stage. The adding circuit 531 is configured to sum, at the inference stage, all temporal attention weights with respect to all description terms of the retrieval description, for each video temporal segment of the video. The a retrieving circuit 532 is coupled with the adding circuit 531, and configured to retrieve or pick up video temporal segments based on the sum result of the adding circuit 531. In one implementation, the retrieving circuit 532 is configured to retrieve video temporal segments with a summed temporal attention weight greater than a threshold to be the video temporal segments, and provide the retrieved video temporal segments to a display for displaying. If there is no video temporal segment with a summed temporal attention weight greater than a threshold, the retrieving circuit 532 will feed a NULL result or any information indicating that no qualified video temporal segment has been retrieved.

The processor 53 may further be provided with a sorting function. The sorting function aims to sort video temporal segments based on their summed temporal attention weights. Understandably, the sorting function can be integrated to the adding circuit 531, or can be integrated to the retrieving circuit 532. Alternatively, the sorting function can be achieved via a component independent from and coupled to the adding circuit 531 and retrieving circuit 532. The disclosure is not particularly limited.

Figure 6:
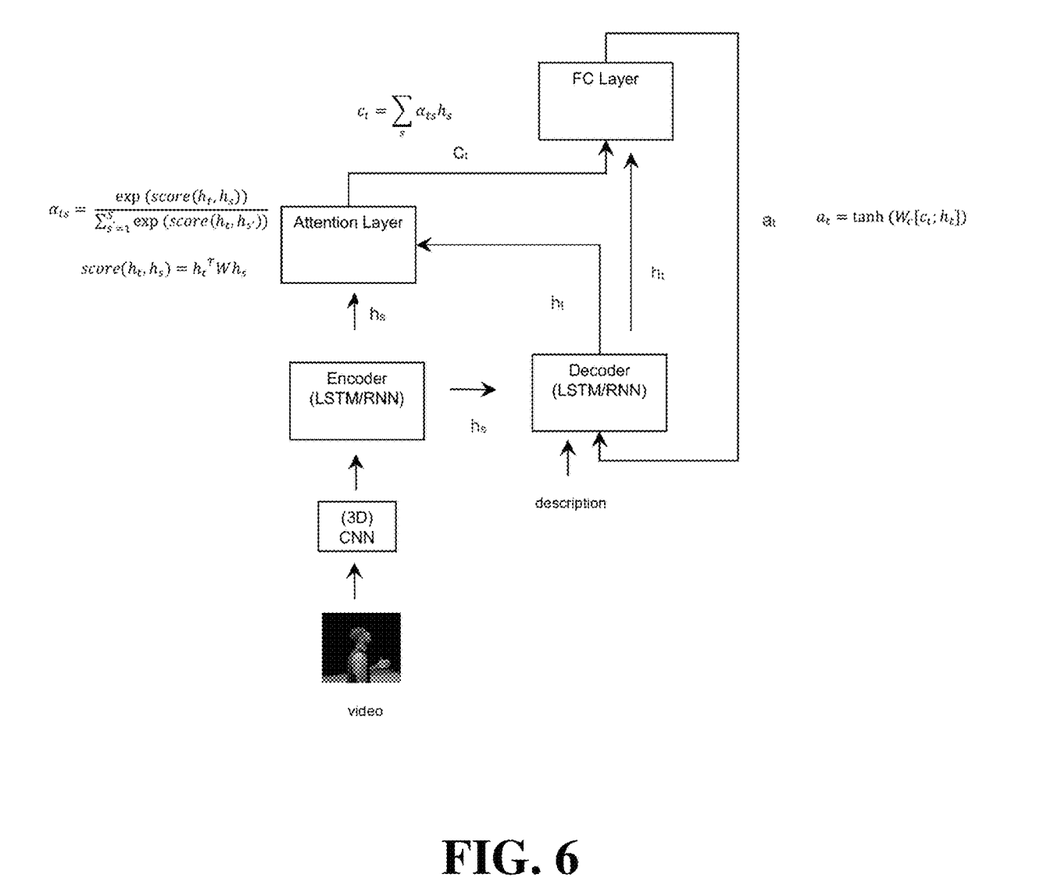
FIG. 6 is a schematic diagram illustrating a proposed video temporal segments retrieval framework.
Figure 7:
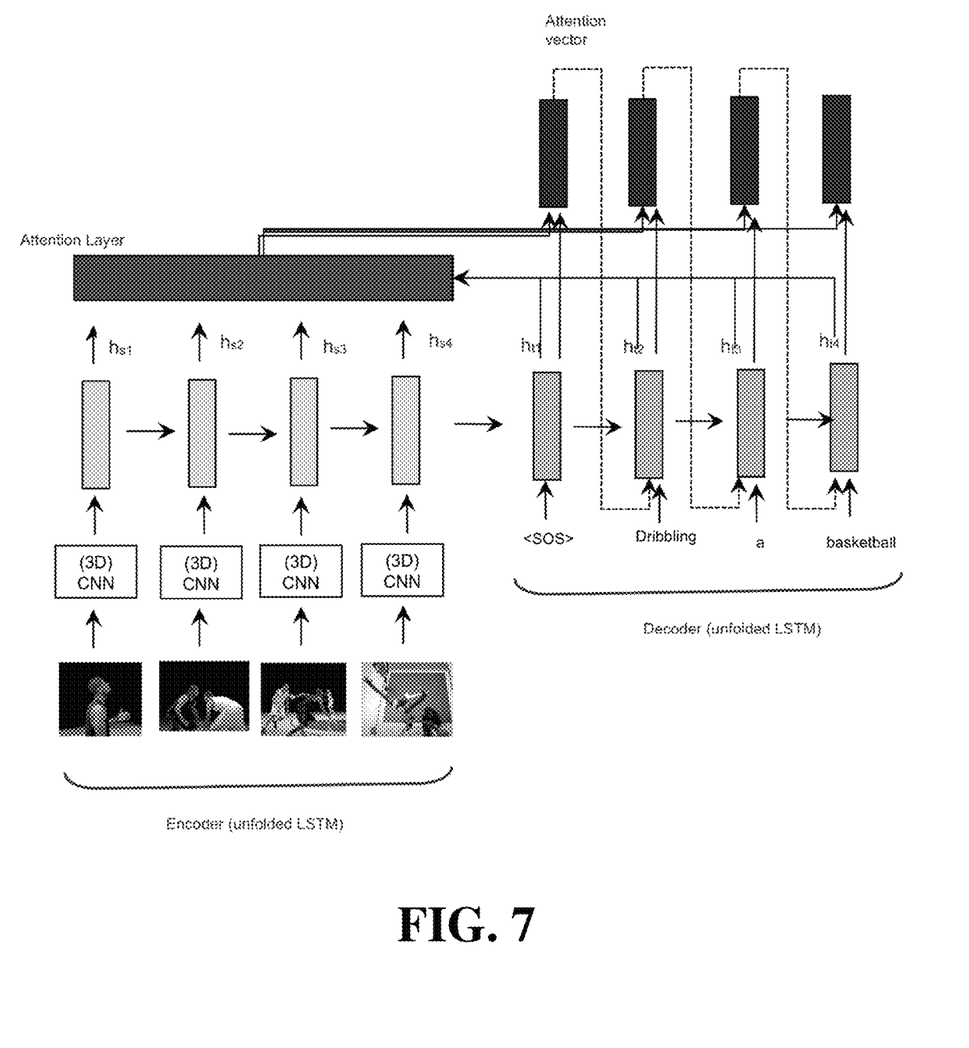
FIG. 7 is another schematic diagram illustrating the proposed video temporal segments retrieval framework.

Operations at the training stage and the inference stage of FIG. 4 as well as operations of the system illustrated in FIG. 5 will be further better understood with reference to FIG. 6 and FIG. 7, in which the proposed sequence-to-sequence model for video temporal segments retrieval (in other words, Temporal Action Localization) with natural language is illustrated respectively.

Training Stage

As illustrated, a standard encoder-decoder LSTM framework with an attention module is adopted. At training stage, the proposed technology aims to learn an attention layer that can give weights to different video frames based on their correlation with each description term contained in a retrieval description. Unlike traditional captioning method that mainly employ decoder as the next-word generator, in this proposed technology, not only a video consisting of video frames $(x_1, \ldots, x_n)$ but also a retrieval description $(y_1, \ldots, y_m)$ are unconventionally fed into the learned encoder-decoder. Meanwhile, temporal attention weights $\alpha_t$ for each term contained in the retrieval description are kept to indicate corresponding temporal segments in the video.

Note that during the training stage, aligned descriptions for video segments are not needed. Compared with the related art in which paired temporal-description dataset is required, system memory can be saved, thereby improving the efficiency of the processor.

I. CNN and Encoder

For describing video clips, a frame feature extractor is employed and it can be either a CNN or 3D CNN (e.g., C3D, which aims at learning spatial-temporal features for video clips using 3D CNN trained on large-scale video dataset). As illustrated in FIG. 6 and FIG. 7, a video is input into a CNN. Kaiming He, Xiangyu Zhang, Shaoqing Ren, and Jian Sun, "Deep Residual Learning for Image Recognition," CVPR 2016, gives an example of the CNN which can be used herein, D. Tran, L. Bourdev, R. Fergus, L. Torresani, and M. Paluri, "Learning Spatiotemporal Features with 3D Convolutional Networks," ICCV 2015, gives an example of the 3D CNN which can be used herein, the entire contents of which are hereby incorporated by reference. In one implementation, the video is split into 16-frames clips and then resized to 224×224 to fit the input of the C3D model for example. Frame feature information from the CNN or 3D CNN, for example, the last fully connected layer in the neural network (i.e., the last FC layer before softmax output layer), are extracted for each video clip.

FIG. 6 illustrates the LSTM stack unrolled over time. As illustrated, the extracted FC-layer feature is then fed into an encoder. The encoder can be implemented with a stacked RNN (which can be referred to as a first stacked RNN, e.g., LSTM) to record temporal information, where the output of each LSTM unit is its current state vector $h_s$. By the way, as can be seen, the output of each LSTM unit of the encoder is provided to a decoder and an attention layer. There is no cross-entropy loss during this stage when the LSTMs are encoding.

II. Decoder and Attention Layer

After all the video frames in the video are exhausted by the encoder, the decoder, for example, a stacked RNN (can be referred to as a second stacked RNN, e.g., LSTMs) is fed by the start-of-sentence (<SOS>) tag, which prompts it to start decoding its current hidden representation into a sequence of words. The decoder is initialized with the last hidden state $(h_s)$ of the encoder, so the source information can be accessed. As can be seen from FIG. 6, the current state vector $h_s$ of the encoder is fed to the decoder. Specifically, as illustrated in FIG. 7, the current state vectors $h_{s1}$, $h_{s2}$, $h_{s3}$, and $h_{s4}$ are fed to the decoder. "A sequence of words" refers to the description terms contained in the retrieval description, for example, each of "dribbling", "a", and "basketball" is a description term.

The current hidden representation is represented as $h_t$ in the figures. For example, in case a retrieval description of "dribbling a basketball" is input by user:

timestep 00: input='<SOS>', decoder hidden representation=h0;
timestep 01: input='dribbling', decoder hidden representation=h1;
timestep 02: input='a', decoder hidden representation=h2;
timestep 03: input='basketball', decoder hidden representation=h3; and so on.

The vectors $h_t$ and $h_s$ are computed on a time step basis. On the encoder side, "one time step" refers to inputting or reading one video frame/clip/segment. On the decoder side, "one time step" refers to inputting or reading one word or a sequence of words, such as "dribbling", "a", or "basketball".

In the following, attention computation at the attention layer and a FC layer will be detailed. As illustrated in FIG. 6, the output of the encoder, which is represented as $h_s$ and the output of the decoder, which is represented as $h_t$, are provided to the attention layer for attention computation. Specifically, as illustrated in FIG. 7, vectors $h_{s1}$, $h_{s2}$, $h_{s3}$, and $h_{s4}$ output from the encoder and vectors $h_{t1}$, $h_{t2}$, $h_{t3}$, and $h_{t4}$ output from the decoder are input into the attention layer. With regarding to the decoder, the output vector thereof will be also provided to the FC layer. As illustrated in FIG. 6, the output vector $h_t$ is fed to the FC layer.

The attention computation happens at every decoder time step. The attention computation includes the following stages. First, as illustrated in FIG. 6, at the attention layer, the current target hidden state $h_t$ from the decoder is compared with all source states $h_s$ from the encoder to derive a Temporal Attention Weight $\alpha_t = [\alpha_{t1}, \alpha_{t2}, \ldots, \alpha_{tS}]$, where W is weight matrix for generating un-normalized temporal score and can be represented as $W_s$ to be distinguished from the matrix $W_c$ appearing in the following:

$$\text{score}(h_t, h_s) = h_t^T W h_s$$

$$\alpha_{ts} = \frac{\exp(\text{score}(h_t, h_s))}{\sum_{s'=1}^{S} \exp(\text{score}(h_t, h_{s'}))}$$

Based on the attention weights, a context vector $c_t$ can be obtained as the weighted average of the source states.

$$c_t = \sum_s \alpha_{ts} h_s$$

At the FC layer, combine the context vector $c_t$ obtained from the attention layer with the current target hidden state $h_t$ obtained from the decoder to yield the final attention vector $a_t$, where $W_c$ is weight matrix for generating $a_t$.

$$a_t = \tan h(W_c[c_t; h_t])$$

As illustrated in FIG. 6, the final attention vector $a_t$ will be provided to the decoder as an input thereof, based on which the decoder will yield subsequent output. The number of the final attention vectors is consistent with the number of description terms contained in the retrieval description. Still using "<SOS> dribbling a basketball" as an example, at the FC layer, four final attention vectors will be obtained and then input to the decoder.

While training in the decoding stage, the model of FIG. 6 or FIG. 7 can maximize the log-likelihood of the predicted output sentence given the hidden representation ($h_t$) of the visual frame sequence, final attention vector ($a_t$), and the previous words it has seen. For a model with parameters $\theta$ and output sequence $Y = (y_1, \ldots, y_m)$, this is formulated as:

$$\arg\max_\theta \Sigma \log p(y_t | h_{t-1}, a_{t-1}, y_{t-1}; \theta)$$

This log-likelihood is optimized over the entire training dataset using stochastic gradient descent. The loss is computed only when the LSTM is learning to decode. The purpose of this operation is to train the direction of the whole neural network of FIG. 6 or FIG. 7 to obtain the parameters of each component (e.g., the attention layer).

Inference Stage

Given the sequence of video frames ($x_1, \ldots, x_n$) and a retrieval description ($y_1, \ldots, y_m$), with aid of the architecture illustrated in FIG. 6 or FIG. 7, in the inference stage, the video temporal segments for the corresponding retrieval description can be detected in the video. As the retrieval description example 'dribbling a basketball' of FIG. 8, the proposed system gradually collects the attention weights for each video segment with respect to each description term. For example, as illustrated in the second row of FIG. 8, the most possible time duration for the search term 'dribbling' could be on video temporal segments 3 and 4, where their attention weights are 0.45 and 0.4 respectively.

Figure 8:
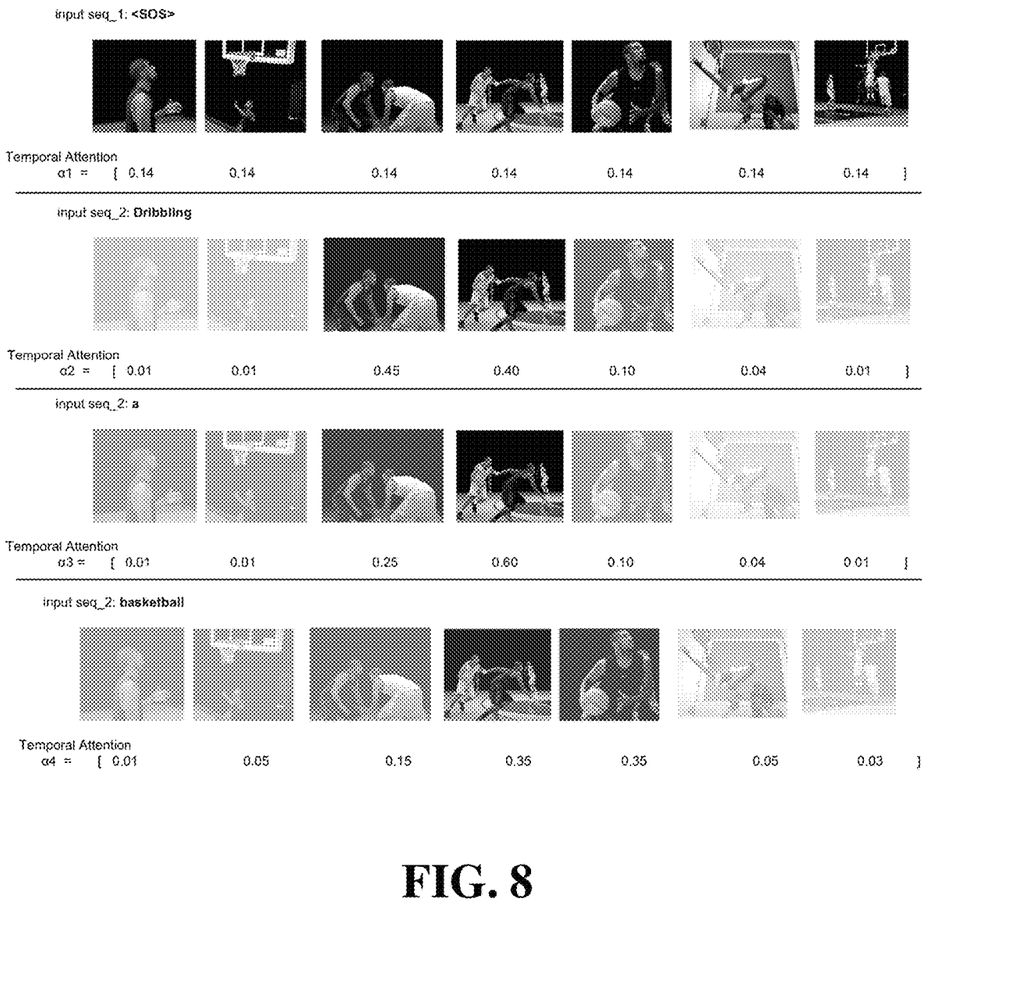
FIG. 8 is a schematic diagram illustrating temporal attention weights for each description term contained in a retrieval description.

To localize the temporal segment for the whole retrieval description, all the temporal attention weights for each temporal segment or temporal interval (i.e., $\Sigma \alpha_t$) are summed up, and a pre-defined threshold is used to identify the most possible temporal segments. For example, video segments having the sum of attention greater than the threshold will be determined as the detected event for the corresponding search. There is a situation that there is no segment having the sum of attention greater than the threshold, in this case, the system may return Null or empty result for this search.

For example, as illustrated in FIG. 8, the sum of temporal attention weights for temporal segment 1 (the leftmost segment) is:

$$\Sigma \alpha_{t1} = \alpha_1 + \alpha_2 + \alpha_3 + \alpha_4 = 0.14 + 0.01 + 0.01 + 0.01 = 0.17$$

Similarly, the sum of temporal attention weights for temporal segment 4 (the fourth segment from the left) is:

$$\Sigma \alpha_{t4} = \alpha_1 + \alpha_2 + \alpha_3 + \alpha_4 = 0.14 + 0.40 + 0.60 + 0.35 = 1.49$$

Figure 9:
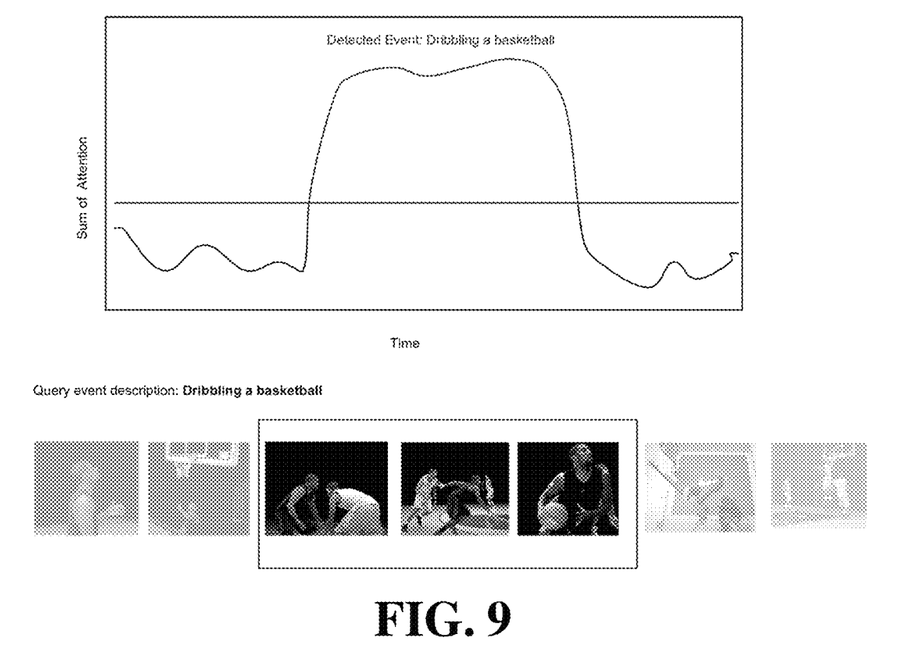
FIG. 9 is a schematic diagram illustrating temporal action localization based on sum of attention weights.

The sum of weight of other segments can be similarly obtained. Specifically, $\Sigma \alpha_{t1} = 0.17$, $\Sigma \alpha_{t2} = 0.21$, $\Sigma \alpha_{t3} = 0.99$, $\Sigma \alpha_{t4} = 1.49$, $\Sigma \alpha_{t5} = 0.59$, $\Sigma \alpha_{t6} = 0.27$, $\Sigma \alpha_{t7} = 0.19$. The pre-defined threshold is 0.5 for example. Based on this, as shown in FIG. 9, the events retrieved, that is, the temporal interval for the search 'dribbling a basketball' can thus be determined as the dark region. That is, according to the query event description of "dribbling a basketball", video segments x3~x5 will be determined as the video segments retrieved.

Figure 10A:
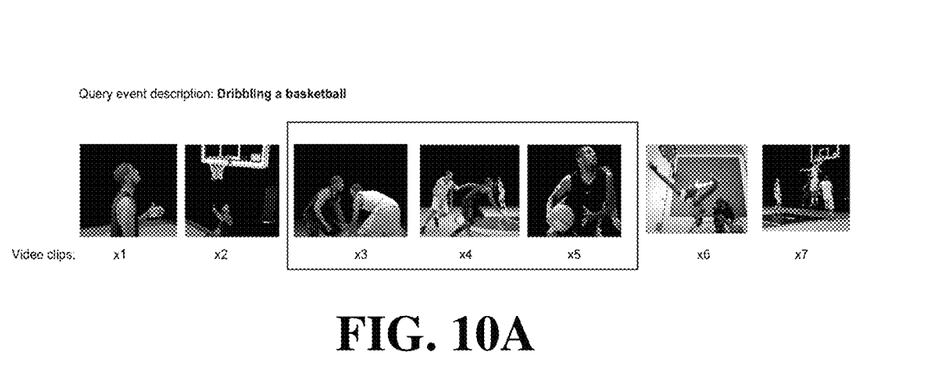
FIGS. 10A and 10B illustrate the result of temporal segments retrieval.

Thus, given a video (containing segments x1~x7) and a retrieval description, the proposed technology can help localize the corresponding temporal segments in the video. As illustrated in FIG. 10A, in terms of the query event description of "dribbling a basketball", the proposed system will return video segments x3~x5, which best describe the temporal event of 'dribbling a basketball'.

Figure 10B:
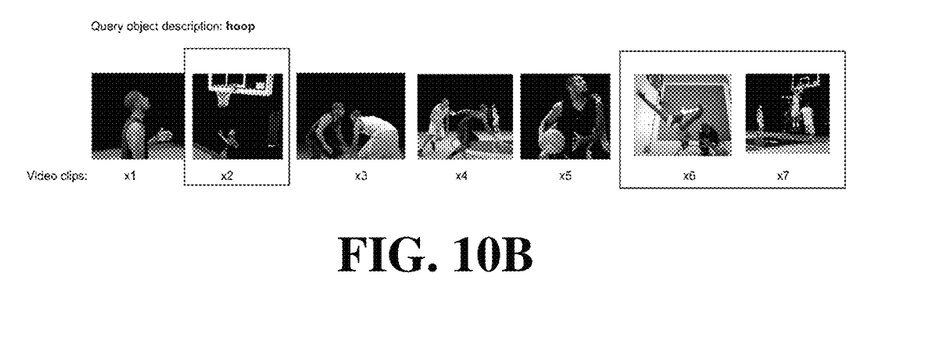

As another example, given a video and search (or query) object description, the proposed technology can help localize the corresponding temporal segment of the specified object in the video. As illustrated in FIG. 10B, in terms of the query object description of "hoop", the proposed system will return video segments x2 and x6~x7, which contains the object of 'hoop' in the temporal segments.

It should be noted that, to avoid redundancy, duplicate descriptions of the same or similar parts are not made herein. For example, the computation of the data or information such as vectors $h_t$, $h_s$, $a_{ts}$, $a_t$ and the like can be equally applied to various embodiments of the disclosure without conflict.

The present disclosure or any part(s) or function(s) thereof may be implemented using hardware, software, or a combination thereof, and may be implemented in one or more computer systems or other processing systems. A computer system for performing the operations of the present disclosure and capable of carrying out the functionality described herein can include one or more processors connected to a communications infrastructure (e.g., a communications bus, a cross-over bar, or a network). Various software embodiments are described in terms of such an example computer system. After reading this description, it will become apparent to a person skilled in the relevant art(s) how to implement the disclosure using other computer systems and/or architectures.

The computer system can include a display interface that forwards graphics, text, and other data from the communication infrastructure (or from a frame buffer) for display on a display unit. The display interface can communicate with a browser. The computer system also includes a main memory, preferably a random access memory, and may also include a secondary memory and a database. The secondary memory may include, for example, a hard disk drive and/or a removable storage drive, representing a floppy disk drive, a magnetic tape drive, an optical disk drive, etc. The removable storage drive reads from and/or writes to a removable storage unit in a well known manner. The removable storage unit can represent a floppy disk, magnetic tape, optical disk, etc. which is read by and written to by the removable storage drive. As will be appreciated, the removable storage unit can include a computer usable storage medium or computer-readable medium having stored therein computer software and/or data.

The computer system may also include a communications interface which allows software and data to be transferred between the computer system and external devices. Computer program medium and computer usable medium refer generally to media such as the removable storage drive, a hard disk installed in the hard disk drive, and signals. These computer program products provide software to the computer system.

Computer programs or control logic are stored in the main memory and/or the secondary memory. Computer programs may also be received via the communications interface. Such computer programs or control logic (software), when executed, are operable with the computer system or its processor to perform the features and functions of the present disclosure, as discussed herein.

The foregoing description has been presented for the purpose of illustration and description. It is intended to be exhaustive or to limit the specification to the precise form disclosed. Many modifications and variations are possible in light of the above teaching. It is intended that the scope of the disclosure be not limited by this detailed description, but rather by the claims of this application.

What is claimed is:

1. A method for retrieving video temporal segments, comprising:
analyzing a video to obtain frame feature information of the video;
inputting the frame feature information into an encoder to output first data relating to temporal information of the video;
inputting the first data and a retrieval description for retrieving video temporal segments of the video into a decoder to output second data;
conducting attention computation training according to the first data and the second data; and
determining video temporal segments of the video corresponding to the retrieval description according to the attention computation training.

2. The method of claim 1, wherein conducting the attention computation training according to the first data and the second data comprises:
inputting the first data and the second data into an attention layer coupled with the encoder and the decoder;
obtaining, at the attention layer, temporal attention weight data for each video temporal segment of the video based on correlation of each video temporal segment with each description term contained in the retrieval description;
obtaining, at the attention layer, weighted average data, based on the first data and the temporal attention weight data, and outputting the weighted average data to a fully connected (FC) layer coupled with the attention layer and the decoder; and
obtaining, at the FC layer, a final attention data based on the weighted average data and the second data, and outputting the final attention data to the decoder.

3. The method of claim 2, wherein the temporal attention weight data is obtained by:

$$\text{score}(h_t, h_s) = h_t^T W h_s$$

$$\alpha_{ts} = \frac{\exp(\text{score}(h_t, h_s))}{\sum_{s'=1}^{S} \exp(\text{score}(h_t, h_{s'}))}$$

wherein
$h_s$ represents the first data, $h_t$ represents the second data, W represents a weight matrix for generating un-normalized temporal score, and $\alpha_{ts}$ represents the temporal attention weight data; $h_s$ and $h_t$ are computed on a time step basis.

4. The method of claim 3, wherein the weighted average data is obtained by:

$$c_t = \sum_s \alpha_{ts} h_s$$

wherein $c_t$ represents the weighted average data.

5. The method of claim 4, wherein the final attention data is obtained by:

$$a_t = \tan h(W_c[c_t; h_t])$$

wherein
$a_t$ represents the final attention data, and $W_c$ represents a weight matrix for generating $a_t$.

6. The method of claim 3, wherein determining the video temporal segments of the video according to the attention computation training comprises:
for each video temporal segment of the video, summing all temporal attention weights with respect to all description terms contained in the retrieval description; and
determining video temporal segments with a summed temporal attention weight greater than a threshold to be the video temporal segments retrieved.

7. The method of claim 2, wherein the first data represents a current state vector representation of the encoder, and the second data represents a current target hidden state vector representation of the decoder.

8. The method of claim 1, wherein analyzing the video to obtain frame feature information of the video comprises:
splitting the video into video temporal segments;
inputting the video temporal segments into a convolutional neural network (CNN) containing multiple layers; and
extracting features from the CNN as the frame feature information of the video.

9. The method of claim 1, wherein the retrieval description is a text input or voice input that is convertible into text.

10. The method of claim 1, wherein the encoder is implemented with a stacked recurrent neural network (RNN), and the decoder is implemented with another stacked RNN.

11. A system for retrieving video temporal segments, comprising:
an extractor, configured to extract frame feature information of a video input thereto;
an encoder, coupled with the extractor and configured to obtain temporal information of the video according to the frame feature information;
a decoder, coupled with the encoder and configured to receive the temporal information from the encoder, receive a retrieval description from outside, and obtain state information of the decoder according to the temporal information and the retrieval description;
a layer generator, coupled with the encoder and the decoder, and configured to receive the temporal information from the encoder and the state information from the decoder and conduct attention computation according to the temporal information and the state information; and
a processor, coupled with the layer generator and configured to determine video temporal segments of the video corresponding to the retrieval description according to the attention computation at the layer generator.

12. The system of claim 11, wherein the layer generator comprises:
an attention layer generator, coupled with the encoder and the decoder, and configured to obtain a temporal attention weight of each video temporal segment of the video based on correlation of each video temporal segment with each description term of the retrieval description and to obtain a weighted average information of the temporal information, according to the temporal attention weight; and
a fully connected (FC) layer generator, coupled with the decoder and the attention layer generator, and configured to obtain final attention information based on the weighted average information and the state information and output the final attention information to the decoder.

13. The system of claim 12, wherein the temporal attention weight is obtained by:

$$score(h_t, h_s) = h_t^T W h_s$$
$$\alpha_{ts} = \frac{\exp(score(h_t, h_s))}{\sum_{s'=1}^{S} \exp(score(h_t, h_{s'}))}$$

wherein
$h_s$ represents the temporal information, $h_t$ represents the state information of the decoder, W represents a weight matrix for generating un-normalized temporal score, and $\alpha_{ts}$ represents the temporal attention weight; $h_s$ and $h_t$ are computed on a time step basis.

14. The system of claim 13, wherein the weighted average information is obtained by:

$$c_t = \sum_s \alpha_{ts} h_s$$

wherein $c_t$ represents the weighted average information.

15. The system of claim 14, wherein the final attention information is obtained by:

$$a_t = \tan h(W_c[c_t; h_t])$$

wherein
$a_t$ represents the final attention information, and Wc represents a weight matrix for generating $a_t$.

16. The system of claim 11, wherein the processor comprises:
an adding circuit, configured to sum, for each video temporal segment of the video, all temporal attention weights with respect to all description terms contained in the retrieval description, to obtain summed temporal attention weight for the each video temporal segment; and
a retrieving circuit, configured to determine video temporal segments with a summed temporal attention weight greater than a threshold to be the video temporal segments retrieved, and provide the retrieved video temporal segments to a display for displaying.

17. A computer system comprising:
at least one non-transitory computer memory for storing and providing access to data;
at least one processor coupled to the at least one non-transitory computer memory to access data;
a convolutional neural network (CNN) storable by the at least one non-transitory computer memory and executable by the at least one processor, the CNN being configured to extract frame feature information of a video;
a video-description based modeler storable by the at least one non-transitory computer memory and executable by the at least one processor, the modeler comprising:
a first stacked recurrent neural network (RNN) coupled with the CNN and configured to obtain temporal information of the video according to the frame feature information of the video;
a second stacked RNN coupled with the first RNN and configured to make hidden representation-based output according to the temporal information and a retrieval description; and
an attention layer hierarchical temporal memory (HTM) coupled with the first RNN and the second RNN and configured to obtain a temporal attention weight of each video temporal segment in the video based on the temporal information and the hidden representation-based output.

18. The computer system of claim 17, wherein the attention layer HTM is configured to obtain the temporal attention weight by:

$$score(h_t, h_s) = h_t^T W h_s$$
$$\alpha_{ts} = \frac{\exp(score(h_t, h_s))}{\sum_{s'=1}^{S} \exp(score(h_t, h_{s'}))}$$

wherein
$h_s$ represents the temporal information output from the first stacked RNN;
$h_t$ represents the hidden representation output from the second stacked RNN; and
W represents a weight matrix for generating un-normalized temporal score, and $\alpha_{ts}$ represents the temporal attention weight.

19. The computer system of claim 18, wherein the modeler further comprises:
a fully connected (FC) layer HTM coupled with the attention layer HTM and the second stacked RNN, and configured to provide input for the second stacked RNN.

20. The computer system of claim 19, wherein
the attention layer HTM is further configured to obtain a context vector $c_t$ as follows and output the context vector to the FC layer HTM:

$$c_t = \sum_s \alpha_{ts} h_s;$$

the FC layer HTM is configured to obtain a final attention vector $a_t$ as follows and input the final attention vector to the second stacked RNN:

$$a_t = \tan h(W_c[c_t; h_t])$$

wherein Wc represents a weight matrix for generating $a_t$.

* * * * *